(No Model.)
C. M. CROWE.
ANIMAL TRAP.
No. 331,945. Patented Dec. 8, 1885.
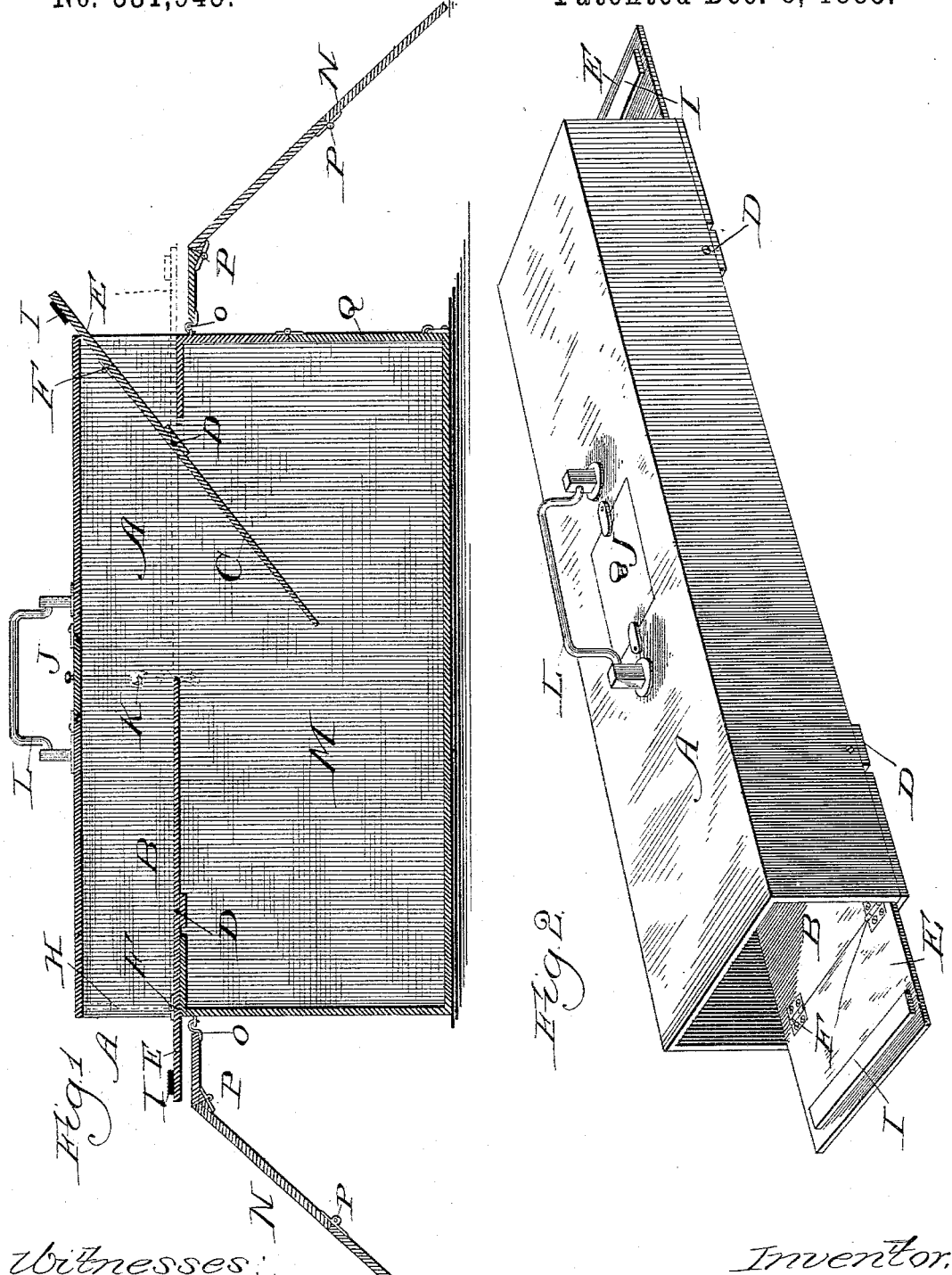
Witnesses:
Chas. E. Gaylord.
Arthur Johnson.
Inventor:
C. M. Crowe
By Jas. A. Cowles,
Attorney.

UNITED STATES PATENT OFFICE.

CHARLES M. CROWE, OF CHICAGO, ILLINOIS.

ANIMAL-TRAP.

SPECIFICATION forming part of Letters Patent No. 331,945, dated December 8, 1885.

Application filed September 14, 1885. Serial No. 177,014. (No model.)

*To all whom it may concern:*

Be it known that I, CHARLES M. CROWE, a citizen of the United States, residing in Chicago, in the State of Illinois, have invented certain new and useful Improvements in Animal-Traps, of which the following is the specification.

The nature and object of this invention are to produce a cheap and efficient animal-trap, as will hereinafter appear.

Figure 1 is a longitudinal vertical sectional elevation of the trap. Fig. 2 is a perspective view of the trapway detached from the vault.

A is the trapway, the floor of which is made of two tilting doors, B and C, pivoted to the sides of the covered trapway at D. The division between the two tilting doors is at or near the center of the covered way. The outer end of each tilting door of the floor of trapway extends beyond the end of the way. (See E E.) These extension ends are hinged at F F, and when turned up they form doors, as shown by the dotted lines H, Fig. 1. These tilting doors are pivoted at one side of their centers, and the outer ends are weighted. (See I I.) In the top and at the center of the trapway is a door, J, through which the bait is passed and attached to hook K, hanging from the door J.

L is a handle attached to the top of the trapway.

M is a vault, over which is placed the trapway A, and secured thereto by any detachable means.

N N are bridges attached to each end of the vault or trapway, extending from the ground up to the entrance at each end of the trapway. It is detachable from the vault or way, as shown at O O. Each bridge is made folding by being made in sections, and the sections are hinged together. (See P P.) When desired, the bridges can be folded and placed within the vault. Q is a door leading into the vault.

When in use, bait is placed on hook K, and each end of the trapway is left open. The rat or mouse passes up either bridge into the end of the trapway, when the door of the floor tilts, and the rat or mouse falls into the vault below, whence he is removed through the door Q. The tilting door at once resumes its natural horizontal position, and is ready for another rat or mouse.

It will be observed that the trapway is open at both ends, thus enabling the rats or mice to enter at either end. I have described a special vault over which my trapway is placed. It is quite manifest that I could use any kind of a vault—such as a barrel or box. It will also be observed that my trapway is covered.

I claim—

1. The covered trapway, with openings at each end and tilting doors in the floor, said tilting doors having hinged extensions beyond the ends of the covered way, which, when turned up, will close the ends of the trapway, substantially as shown and described.

2. The covered trapway, with openings at each end and tilting doors in the floor, said tilting doors having hinged extensions beyond the ends of the covered way, which, when turned up, will close the ends of the trapway, substantially as shown and described.

CHARLES M. CROWE.

Witnesses:
JAS. A. COWLES,
B. ATWATER.